Feb. 7, 1928.

D. FERRARI 1,658,632

AUTOMOBILE TIRE

Original Filed Jan. 9, 1925

INVENTOR
*Dario Ferrari*
BY
ATTORNEY

Patented Feb. 7, 1928.

1,658,632

UNITED STATES PATENT OFFICE.

DARIO FERRARI, OF BOSTON, MASSACHUSETTS.

AUTOMOBILE TIRE.

Application filed January 9, 1925, Serial No. 1,341. Renewed December 27, 1927.

This invention relates generally to tires for automobile and truck wheels, the invention having for an object the provision of a novel tire of this sort characterized by long wear, while preserving a desired degree of resiliency and cushioning effect.

For further comprehension of the invention, and of the objects and advantages thereof, reference will be had to the following description and accompanying drawing, and to the appended claims in which the various novel features of the invention are more particularly set forth.

Figure 1:
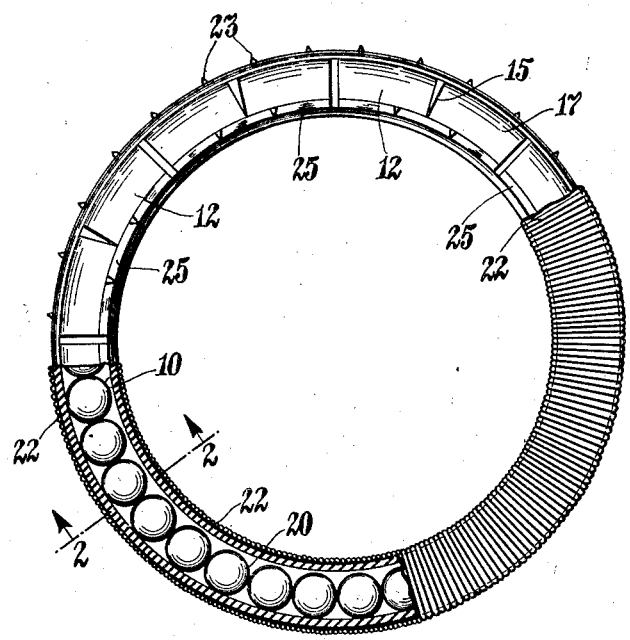

Fig. 1 of the drawing is a face view, with certain parts broken away and others in longitudinal section, showing my improved tire applied to an automobile wheel.

Figure 2:
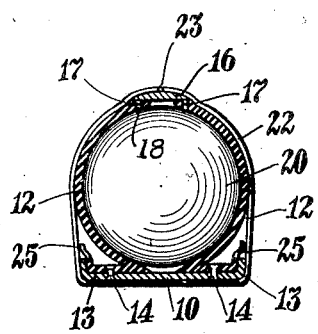

Fig. 2 is an enlarged detail transverse sectional view taken on the line 2—2 of Fig. 1.

In the drawing the reference numeral 10 indicates the usual metal rim of the type of automobile wheel commonly known as a wire wheel, which has wire spokes instead of wooden ones, it being understood that the invention may be equally well applied to a wheel having wooden spokes. In carrying out my invention I rivet to the outer face of the rim 10 channeled elements having integral therewith complementary side members 12 of approximately semi-circular cross section. These side members 12 are made in sections and extend completely around the rim 10 of the wheel. Each section may be split radially inwardly as at 15 for a distance from its outer edge at desired points along its length to increase its resiliency. At their inner side these sections are provided with integral base-flanges 13 that rest upon the rim 10 and through which the securing rivets 14 are passed.

At the outer periphery of the wheel these members 12 are spaced apart from one another a slight distance, and the space therebetween is covered by a ring 16 that overlaps and surrounds the marginal portions of the said side members. This ring is formed on the inner face thereof, adjacent its side edges, with rows of studs 17 that engage in complementary holes 18 in the edges of the said members, whereby the ring is held against lateral displacement, and the tread of the tire, constructed as explained below, serves to hold the said ring against radial displacement. It being understood that a tire in service is roughly treated and therefore requires substantial means to hold the resilient parts together. In the space enclosed between the members 12 a number of rubber balls 20 are preferably placed, these balls being in close adjacence to one another as shown and having a diameter substantially the same as the channel formed between the members 12, a resilient cushion being thus provided.

The tread of my improved tire is formed by a wire 22 that is wound around the parts 10, 12 and 16 and has its turns close together, this wire being of steel. The ring 16 may be formed with a plurality of spikes 23 spaced therearound and projecting between certain of the turns of the wire as shown. To ensure of the wire 22 remaining at all times in tight engagement with the said parts the base flanges 13 of the members 12 may be extended in the form of laterally projected resilient segmental elements 25 that bear on the said wire, and which are compressed laterally inward when the wire is wound on the wheel.

Having thus described my invention, what I claim as new and desire to protect by Letters Patent of the United States is as follows:—

1. In combination with the rim of a wheel, a pair of opposed complementary members each consisting of a number of segmental sections, each of said sections having a base with laterally projecting resilient elements fixed to the rim, the outer edges of said complementary members being in spaced relation, a ring covering the space between the outer edges of said members, cushioning means confined between the complementary members, a plurality of studs fixed on the inner face of said ring and engaging apertures in adjacent portions of said members to retain said ring against lateral displacement, and a wire tread element wound around the rim and bearing against the laterally projecting resilient elements of the said members to maintain said wire in taut condition, said wire being also wound around said complementary members and said ring to retain the ring against radial displacement.

2. In combination with the rim of a wheel, a pair of opposed complementary members each consisting of a number of segmental sections fixed to the rim, said complementary members confining therebetween cushioning means, the outer edges of said members being in spaced relation, a ring covering the space between the outer edges of said members, a plurality of studs fixed on the inner face of said ring and engaging apertures in adjacent portions of said members to retain said ring against lateral displacement, and a wire tread element wound around the said rim, complementary members and ring to retain said ring against radial displacement.

3. In combination with the rim of a wheel, a pair of opposed complementary members each consisting of a number of segmental sections, each of said sections having a base with laterally projecting resilient elements fixed to the rim, the outer edges of said complementary members being in spaced relation, a ring covering the space between the outer edges of said members, cushioning means confined between the complementary members, means for retaining said ring against lateral displacement, a wire tread element wound around said rim and bearing against the laterally projecting resilient elements of the said members to maintain said wire in taut condition, said wire being also wound around said members and said ring, to retain the ring against radial displacement, and a plurality of spikes projecting from certain portions of the outer surface of said ring, between certain turns of said wire to hold said wire against displacement.

4. An automobile wheel including a rim, a pair of opposed complementary members, each having a base with laterally projecting resilient elements fixed to the rim, the outer edges of said complementary members being in spaced relation, a ring securely connecting said members, cushioning means confined by the rim, complementary members and connecting ring, and means spirally wound around the rim, complementary members and connecting ring for securely holding the several elements together.

In testimony whereof I have affixed my signature.

DARIO FERRARI.